(12) United States Patent
Juzkow et al.

(10) Patent No.: US 11,205,809 B2
(45) Date of Patent: Dec. 21, 2021

(54) EARLY DETECTION OF THERMAL INCIDENT IN BATTERY PACK

(71) Applicant: NIO USA, Inc., San Jose, CA (US)

(72) Inventors: Marc W. Juzkow, Livermore, CA (US); Yadunandana Yellambalase, Mountain View, CA (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/742,626

(22) Filed: Jan. 14, 2020

(65) Prior Publication Data

US 2021/0218079 A1   Jul. 15, 2021

(51) Int. Cl.
| | | |
|---|---|---|
| *H01M 10/48* | (2006.01) | |
| *B60L 50/64* | (2019.01) | |
| *B60L 3/00* | (2019.01) | |
| *H01M 50/20* | (2021.01) | |
| *H01M 10/052* | (2010.01) | |

(52) U.S. Cl.
CPC .......... *H01M 10/486* (2013.01); *B60L 3/0046* (2013.01); *B60L 50/64* (2019.02); *H01M 50/20* (2021.01); *H01M 10/052* (2013.01)

(58) Field of Classification Search
CPC ............................ H01M 10/486; H01M 50/20
See application file for complete search history.

(56) References Cited

U.S. PATENT DOCUMENTS

| | | |
|---|---|---|
| 7,763,381 B2 | 7/2010 | Mehta et al. |
| 8,785,026 B2 | 7/2014 | Hu et al. |
| 9,368,843 B2 | 6/2016 | Beyerle, II et al. |
| 9,716,296 B2 | 7/2017 | Wayne et al. |
| 2013/0216887 A1* | 8/2013 | Wayne ................ H01M 10/647 429/120 |
| 2013/0260192 A1* | 10/2013 | LePort .................. H01M 10/48 429/62 |
| 2016/0197324 A1* | 7/2016 | DeKeuster ........ H01M 10/4207 429/82 |
| 2019/0036178 A1 | 1/2019 | Karner et al. |
| 2019/0140233 A1 | 5/2019 | Yeh |

FOREIGN PATENT DOCUMENTS

| | | |
|---|---|---|
| CN | 106450576 | 2/2017 |
| JP | 2018206605 | 12/2018 |

OTHER PUBLICATIONS

U.S. Appl. No. 16/748,078, filed Jan. 21, 2020, Juzkow et al.
"eGRAF® SpreaderShield™ Heat Spreaders," GrafTech AET, Apr. 2017, TDS 321, 2 pages.

* cited by examiner

*Primary Examiner* — Olatunji A Godo
(74) *Attorney, Agent, or Firm* — Sheridan Ross P.C.

(57) ABSTRACT

Devices, methods and systems used to detect thermal incidents are disclosed. In one embodiment, there may be a thermal incident detection apparatus for a battery pack including one or more battery modules, the one or more battery modules comprising a plurality of battery cells arranged in a plurality of rows, wherein each battery cell in the one or more battery modules comprises a vent, the apparatus comprising a thermally anisotropic material positioned in proximity to one or more battery cells of the one of more battery modules, wherein the thermally anisotropic material has an in-plane thermal conductivity greater than a through-plane thermal conductivity; and a sensor positioned in proximity to the thermally anisotropic material to sense thermal energy transferred by one or more of the battery cells to the thermally anisotropic material.

19 Claims, 6 Drawing Sheets

EARLY DETECTION OF THERMAL INCIDENT IN BATTERY PACK

FIELD

The present disclosure is generally directed to energy storage devices, in particular, towards batteries with early thermal incident detection.

BACKGROUND

In recent years, the demand for high performance electrochemical cells has increased, driven in part by the increasingly large number of portable consumer electronics products and growing needs of batteries for hybrid and fully electric vehicles.

Lithium battery cells (Li cells) are found in many applications requiring high energy and high-power densities, as they can provide high volumetric and gravimetric efficiency in single and multi-cell battery modules and packs. Such battery modules and packs can be used in many applications, for instance in electric vehicles.

However, multi-cell Li battery modules and packs are susceptible to extreme heat build-up, fire or explosion through a phenomenon known as passive propagation, or thermal diffusion, where one or a small number of cells go into thermal runaway causing the other cells to also go into thermal runaway. Thermal runaway occurs when heat is generated inside a Li cell exceeding the capability of the Li cell to release that heat. There are many scenarios that can create heat inside the Li cell, from an internal short circuit to an external electrical fault. Thermal runaway resembles an uncontrolled positive feedback loop that accelerates the internal temperature of a Li cell (and/or many Li cells) eventually leading to the entire battery pack to vent or be ruptured to emit smoke, sparks, fire, and/or an explosion.

Failure of one Li cell can cause a chain reaction or propagation, where additional cells in battery pack fail, potentially causing serious circumstances (i.e. an explosion or fire). While the energy released in one cell can most often be contained within a battery pack of an electric vehicle, posing no danger to the driver of an electrical vehicle, the energy released by many or all cells inside an EV battery pack will most likely fill the cabin of the vehicle with smoke at a minimum and/or cause the entire EV to be engulfed in flames. The safety of the driver and passengers, and bystanders is paramount, and they must be protected.

As more and more Li battery packs are used in electric vehicles, a solution to this issue becomes more pressing. The present disclosure satisfies these and other needs.

SUMMARY

In certain embodiments, the present disclosure relates to a thermal incident detection apparatus for a battery pack. The battery includes one or more battery modules that include a plurality of battery cells arranged in a plurality of rows. Each battery cell in the battery module comprises a vent. The apparatus includes a thermally anisotropic material positioned in proximity to one or more of the battery cells, the anisotropic material having an in-plane thermal conductivity greater than a through-plane thermal conductivity, and a sensor positioned in proximity to the anisotropic material to sense thermal energy transferred by one or more of the battery cells to the anisotropic material. As will be appreciated, a thermally anisotropic material has different thermally conductive properties along different molecular axes, such as along different crystallographic axes.

In some embodiments, the present disclosure relates to a method for detecting a thermal incident in a battery module comprising a plurality of vented cells. The method includes the steps of: sensing, by a sensor, a level of thermal energy in a thermally anisotropic material in thermal communication with one or more of the plurality of vented cells in the battery module, the anisotropic material having an in-plane thermal conductivity of at least about 250 W/m-K; determining, by a battery management system, that the level of thermal energy is abnormal; and implementing, by the battery management system, a predetermined action associated with an occurrence of a thermal runaway event.

In some embodiments, the present disclosure relates to a battery pack for an electric vehicle system that includes: a battery module comprising a plurality of battery cells arranged in a plurality of rows and a battery module enclosure for the battery module, with each of the battery cells comprising a vent; a thermally anisotropic material positioned in proximity to the vents of one or more of the battery cells, the thermally anisotropic material comprising graphite; and one or more sensor(s) positioned to sense a thermal state of the thermally anisotropic material indicative of a thermal runaway event in a battery cell.

The embodiments of the present disclosure can advantageously improve the early detection of thermal incidents of energy storage devices and provide increased safety for electric vehicle drivers, passengers, and bystanders.

Additional features and advantages are described herein and will be apparent from the following Description and the figures.

DETAILED DESCRIPTION

Figure 1:
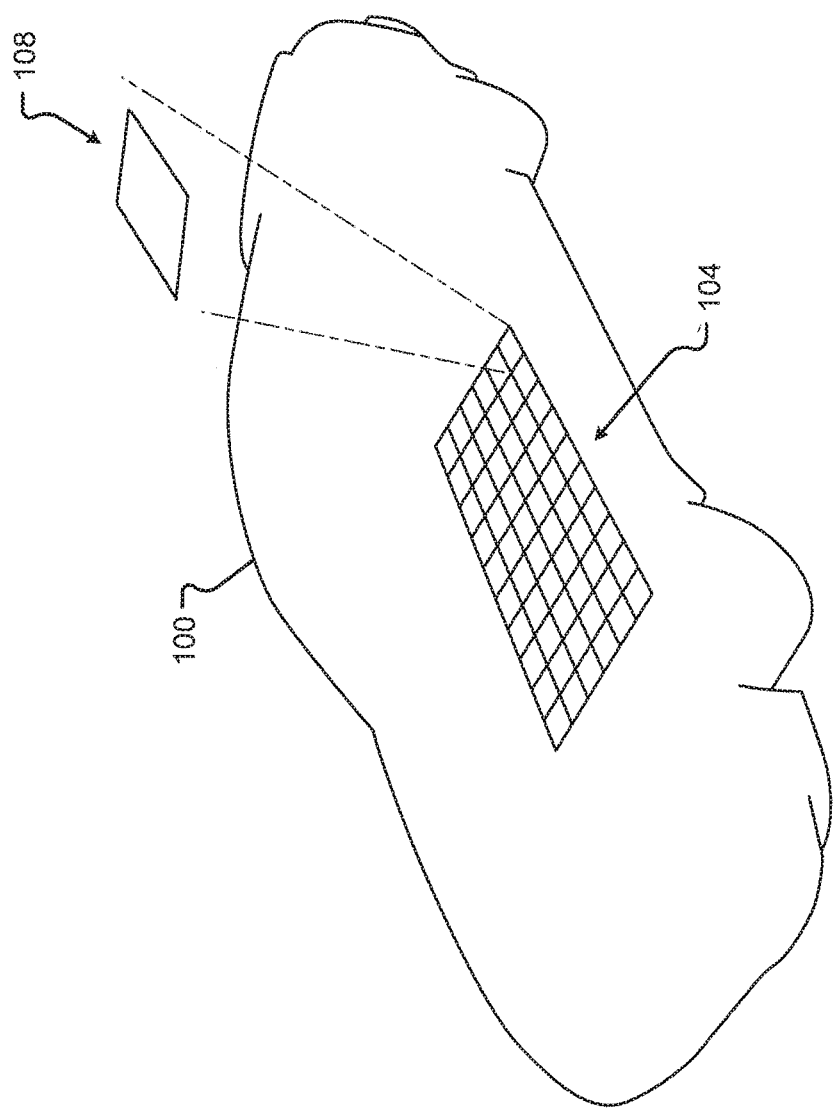
FIG. 1 shows a schematic perspective view of an electrical energy storage system.

Embodiments of the present disclosure will be described in connection with early detection of thermal incidents in electrochemical cells, and in some embodiments, the construction, structure, and arrangement of components making up systems and methods of early detection of thermal incidents in electrochemical cells.

In some embodiments, the present disclosure is directed to a thermally anisotropic material (e.g., in the form of a sheet, foil, or other planar or non-planar substrate), such as eGRAF® SpreaderShield™ made of pure graphite foil, positioned in spatial proximity to cell vents and thermal sensors positioned in operational contact with the thermally anisotropic material that together can sense rapidly and effectively an unusual thermal emission from one or more cells. The thermally anisotropic material is typically dimensionally and crystallographically stable at the high temperatures commonly encountered in a thermal runaway event (e.g., typically at temperatures of at least about 200 but typically no more than about 1,500 degrees Celsius). Stated differently, the thermally anisotropic material is free of a phase change material that changes phase within this temperature range. In cylindrical and prismatic cells, one or more devices are typically designed into the cell to allow venting of excess pressure and prevent rupturing of the can, violent removal of the cell header, and expulsion of cell components. The vents typically direct the heat released from the cell in one direction. Placement of a sheet of graphite foil spatially opposite the cell vents can "capture and absorb" the heat evolved. Graphite anisotropic materials in particular can have a much higher thermal conductivity in a first direction or plane than in a second direction or plane. Substantially pure graphite anisotropic materials, for instance, can conduct heat 100× greater in the x-y direction than in the z direction. One graphite anisotropic material, for example, has thermal conductivity values of at least about 50, more commonly of at least about 100, more commonly of at least about 150, more commonly of at least about 200, more commonly of at least about 250, more commonly of at least about 300, more commonly of at least about 350, and even more commonly of at least about 400 W/m-K in an in-plane orientation but less than about 50, more commonly no more than about 40, more commonly no more than about 35, more commonly no more than about 30, more commonly no more than about 25, more commonly no more than about 20, more commonly no more than about 15, more commonly no more than about 10, and even more commonly no more than about only 5 W/m-K in a through-plane orientation. This not only can prevent the heat from reaching the cells opposite the cell vents, preventing the thermal runaway of those cells but can also transfer the heat away from the vented cells and its adjacent cells. Some embodiments of the present disclosure can take advantage of this phenomenon by measuring the temperature of the thermally conductive graphite anisotropic material in one or two (for redundancy or proximity) points.

The thermally conductive graphite anisotropic material can enable fewer thermal sensors to be used compared to conventional thermal detection systems. Conventional detection methods use $CO_2$ and $H_2$ gas detectors, voltage, current, pressure and temperature sensors (positioned on cells and/or bus bars, electrochemical impedance spectroscopy, and fiber optics to detect thermal events. If one were to measure the temperature of every cell it would require too many thermocouples (or thermistors), the wiring would be too complex, and the data acquisition system would be very large and cumbersome, causing the overall system cost to be too high. Consider battery packs (or modules) that contain hundreds (e.g. pouch or prismatic) to thousands of smaller cells (e.g. cylindrical 18650 or 21700). In embodiments of this disclosure by measuring one or two points for each or every other module of multiple cells, the number of thermocouples can be substantially minimized, and the monitoring system easier to design into the battery pack, thereby saving costs. Stated differently, the sensors of a conventional thermal incident detection system are generally much more densely distributed with significantly more complex wiring when compared to embodiments of the present disclosure. Embodiments of the present disclosure can also provide fewer false alarms than conventional systems.

In some embodiments, thermocouples are installed in multiple points of the graphite anisotropic material. One example is placing a sensor at either end of the anisotropic material; and another is to place two thermocouples in a middle of the anisotropic material. Modelling of heat transfer can determine how many of the neighboring cells have also gone into thermal runaway. Placing three or more thermocouples in specific spots can be used to approximately pinpoint a spatial location of the cell experiencing thermal runaway.

In some embodiments, multiple light/photo sensors connected to the module electronics are strategically positioned relative to the anisotropic material to catch the light (IF) emitted from the thermal runaway. These light sensors can pick up any burning activities inside the battery pack even faster than temperature sensors. However, a light/photo sensor system should be designed to avoid false positive detections in case of a pack undergoing service by opening a lid or LED status indicators on the modules from triggering the light sensor. This can be done, for instance, by positioning a displacement or other type of sensor to detect opening of the pack for maintenance; requiring maintenance personnel to input, via a user interface of the electric vehicles (EV), a command to deactivate the thermal incident detection system for maintenance; and positioning LEDs in known or remote positions such that false positives can be avoided. The LEDs can be used for validating sensor operation on every power-up of the vehicle. The sensors can be distributed on different electronic module sensors to eliminate false positives. Additionally, the thermal incident detection system of this disclosure can be used in combination with other types of sensors for redundancy and to avoid false positives. As will be appreciated, other types of sensors can be employed to sense thermal events. Embodiments of the present disclosure can be applied to any electrochemical device, particularly large battery packs or modules. There are generally three types of lithium-ion cells typically used in EVs today: namely cylindrical, pouch and prismatic. Individual cells can be arranged in any pattern within a battery module, with a common pattern resembling a honeycomb or matrix. Embodiments of the present disclosure can apply to all larger battery packs (or modules) comprised of any of the three cell types, even 1 kWh or higher, in many different applications ranging from electric bicycles and small scooters to commercial vehicles, industrial vehicles, and trains to large energy storage systems with hundreds of thousands to millions of Wh of energy. Thermal events with large cells can be easier to detect due to the large amount of energy released when compared to thermal events in smaller cylindrical cells.

While it is true that the larger the individual cells used the more difficult it can be to stop thermal runaway propagation, the embodiments of the present disclosure can enable early detection of the initial cell's thermal runaway which could lead to passive propagation or thermal diffusion and thereby enable measures to be taken to warn EV occupants and nearby pedestrians as required by international and national regulations and requirements, and could trigger a fire extinguishment system. Internationally there is an EVS-GTR (Electric Vehicle Safety-Global Technical Regulation) and in China there are GB standards for Safety of EV batteries. Thermal (passive) propagation testing is included in these standards. As the tests are written, it is possible for lithium-ion cells to propagate because stopping the propagation of large lithium-ion cells can be very difficult. As a result, there is a provision in the test that allows one to pass even if the battery pack is engulfed in flames. To pass the test, the passenger and drivers must be given at least 5 minutes of warning from the first cell going into thermal runaway to a hazardous condition occurring in the cabin of the EV. This is designed to allow them safe escape and prevent major injuries or even death.

In a battery pack with two or more separate battery sub-packs (or modules) designed for fail operational redundancy, the thermal incident detection system of the present disclosure can identify which of the sub-packs (or modules) has gone into thermal runaway, enable the automatic disconnection of that sub-pack, and allow the EV to operate on the other sub-pack (fail operational) to allow the driver to move the vehicle to a safe place (i.e. to the side of the road). If the vehicle is in a parked or charging state, then a user interface of the EV can indicate the impending danger through electronics and connectivity options (Lights, horns, Infotainment display, speakers, mobile alerts) and a message through an operator's or owner's mobile phone app.

The thermal incident detection system of the present disclosure can further enable increased gravimetric density through increasing the safety of a horizontal battery cell orientation. Another design that can increase the gravimetric density of battery modules is by utilizing a horizontal battery cell orientation. Orienting the battery cells flat or horizontal rather than vertically can increase the amount of battery cells that may be placed in the battery module, thus increasing battery module gravimetric density. However, more tightly packing a battery module with battery cells can increase risks associated with thermal runaway, in instances where thermal runaway occurs heat may more easily spread to adjacent battery cells. The increased risks can make using a horizontal battery cell orientation have heretofore made this orientation less attractive. A horizontal battery cell orientation may be particularly attractive in situations where small and more compact battery cells are used for a similar pack enclosure. If smaller more compact battery cells were to be vertically orientated there could be a large empty volume which would reduce the total battery cells to be packed. However, if the battery cells are placed in an horizontal configuration they can take up the full height and volume of the pack.

Although embodiments described herein may be described with respect to a battery module with a horizontal battery cell orientation, the present disclosure is not so limited. Various embodiments of the present disclosure can apply to more traditional vertical battery cell orientations.

Although embodiments described herein may be described with respect to a ground based electric vehicle, the present disclosure is not so limited. Various embodiments of the present disclosure can apply to any type of stationary or mobile machine using a battery, for example mobile machines including but not limited to, vertical takeoff and landing vehicles, aircraft, spacecraft, electrical grids, and watercraft, among others.

Referring now to FIG. 1, a schematic perspective view of an electrical energy storage system, or battery pack 104 comprising a number of electrical energy storage devices, or battery modules 108, is shown in accordance with embodiments of the present disclosure. In one embodiment, the battery pack 104 may be configured to provide the electromotive force needed for the electrical drive system of a vehicle 100 to operate. An electrical energy storage device for a vehicle generally includes one or more battery packs 104 including a number of battery modules electrically interconnected with one another to provide the electromotive force for the electrical drive system of a vehicle to operate. Each battery module in the battery can include any number of battery cells contained and/or arranged within a structure. Conventional battery modules may include a structure or components that are designed to maximize the number of battery cells contained therein. Although the present disclosure recites battery pack 104, battery modules 108, and/or battery cells as examples of electrical energy storage units, embodiments of the disclosure should not be so limited. For example, the battery cells 308, and/or any other energy storage device disclosed herein, may be any electrical energy storage cell including, but in no way limited to, battery cells, electrochemical double layer capacitors, etc., and/or combinations thereof.

Figure 2:
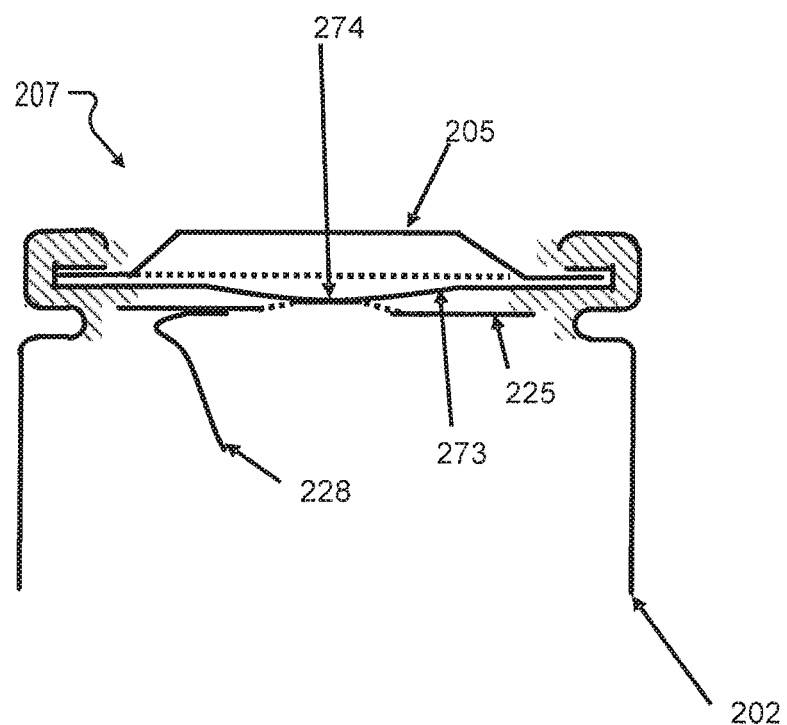
FIG. 2 shows a cross-sectional side view of a header of a battery cell.

FIG. 2 shows a cross-sectional side view of a header 207 of a battery cell 308. A gasket insulator (shaded component) is used as a seal between the can 202 and the header 207.

In FIG. 2, the header 207 includes a positive electrode tab 228 (e.g., an end portion of the positive electrode) that is connected to a weld disc 225, a vent disc 273 and a top cap 205. The connection 274 from the weld disc 225 to the vent disc 273 may be made by welding. A positive electrode tab 228 (e.g., an end portion of the positive electrode) is connected to the weld disc 225 by welding. The vent disc 273 is pressed against the top cap 205, thereby providing an electrical connection from the positive electrode tab 228 to the top cap 205. In some embodiments, a Positive Temperature Coefficient ("PTC") device shaped like a flat ring is positioned between the vent disc 273 and the top cap 205, but this is not typical for applications requiring high drain rates. Thus, the top cap 205 is the cover of the cell and the positive terminal of the cell.

In the event of thermal runaway in the can 202, the resulting internal pressure within the can causes the vent disc 273 to be displaced upwardly and ruptured along an existing score line, thereby discharging thermal runaway-generated gas, sparks and/or flames from the interior to the exterior of the cell. While the cell of FIG. 2 is shown to vent at the top cap 205, it is to be understood that other cell designs have a second vent at the bottom of the cell adjacent to the cold plate (not shown) or another selected location on the can, however in both the horizontal cell and vertical cell design, a bottom vent is in thermal contact with cold plate 340 and as a result, the vent is blocked, forcing the top vent to operate.

In some embodiments, the header 207 has been crimped onto the can 202 so that the interior components of the battery cell are fully enclosed within the can 202 and the header 207. The interior of the cell includes a positive electrode (connected to a positive electrode tab 228, a negative electrode (not shown), separators (not shown), and an electrolyte (not shown). The positive electrode can include a positive electrode active material and a positive electrode current collector. The negative electrode can include a negative electrode active material and a negative electrode current collector. The electrolyte may be present within the positive electrode, the negative electrode, and the separators, and may include a lithium compound such that the electrolyte, the positive electrode, and the negative electrode are in ionically conductive contact with each other.

During charging of the cell, risks of cell overcharging, overheating or short circuiting is typically at the highest. In such a scenario, thermal runaway is a possibility, and the heat generated from the damage to one or more cells may spread to other cells, causing additional problems, such as increased cell failure and dangerous conditions. Also, if a cell header 207 is expelled, this may damage other battery cells 308 within the battery module 108 and lead to other issues such as increased cell failure and dangerous conditions for the battery pack 104. The runaway of a single battery cell 308 runaway can lead to many runaways in many battery cells 308, so early detection is important to warn of the situation and possibly prevent thermal runaway in other battery cells 308.

Figure 3A:
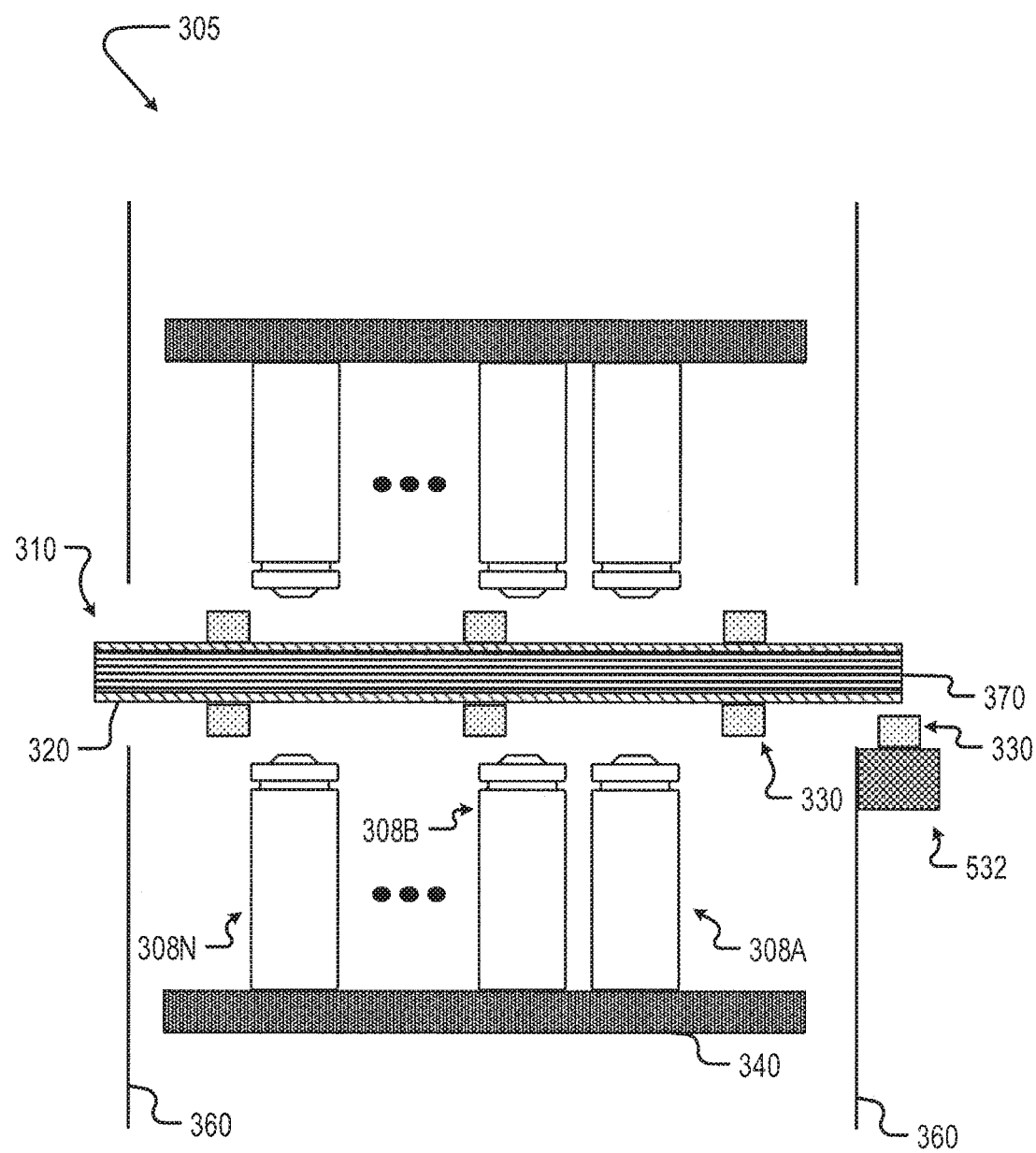
FIG. 3A includes a top down interior view of a battery module and a side view of the barrier wall.

FIG. 3A shows a top-down view of the thermal incident detection system 305 in accordance with embodiments of the present disclosure. The top-down view includes a wall 310 that is disposed between two rows of battery cells 308, where the battery cells 308 positioned proximate to each other and each battery cell 308 has its header 207 towards the wall 310. In the present embodiment, cell headers 207 contain the vents for battery cells 308. One or more spacers (not shown) may be positioned between the wall 310 and the adjacent battery module to maintain a substantially fixed position of each of the modules relative to one another and the wall 310. Additionally, a carrier (not shown) can be engaged with an end of each battery module to maintain each cell in a substantially fixed position relative to one another.

In FIG. 3A, battery cells 308 are aligned horizontally in the battery module 108. In some embodiments, the battery module 108 is split into portions of battery cells 308 where the battery cell headers 207 are facing away from each other. FIG. 3A also shows wall 310 having a thermally anisotropic material 320 fixed to either side of structural element 370. However, in alternative embodiments thermally anisotropic material 320 may be fixed to only one side of structural element 370. FIG. 3A shows sensor 330 and cold plate 340. FIG. 3A also shows two battery modules 108 separated by wall 310 and thermally anisotropic material 320, however this is merely one embodiment, there may be embodiments where wall 310 and thermally anisotropic material 320 are enclosed within one battery module 108. For instance, wall 310 may also include a layer of fire-resistant layer 350 (not shown in FIG. 3A) placed over anisotropic material 320; the three layer embodiment can be seen in FIG. 3B.

Wall 310 can, alternatively or additionally, include a variety of other materials that serve different functions. In some embodiments, wall 310 can include a structural element 370 designed to resist puncture. The puncture resistant material can, for example, include steel, porous steel, aluminum, porous aluminum, composites, ceramics, ceramic matrix composites, carbon, expanded carbon, carbon fiber, carbon fiber-reinforced polymers, graphene, mesh, rubber, polymers, elastomers, titanium, nickel, iron, phase change materials, and/or any combination thereof. Any puncture resistant material used for wall 310 may be processed in such a way as to make it lighter, for instance processing aluminum to get porous aluminum. Other types of processing that may occur to a puncture resistant material selected for wall 310 is the addition additives, for instance impregnating graphite with an additive. Additionally or in the alternative, structural element 370 can include a coating; for instance, structural element 370 may have a dielectric coating.

In some embodiments, wall 310 can include a substantially non-conductive fire-resistant material 350 to enable the wall 310 to act as a fire barrier between the rows of cells. If wall 310 comprises a fire-resistant layer 350 than wall 310 may have high flammability resistance, high arc resistance, and high dielectric strength. For instance, wall 310 may have a non-conductive fire-resistant material that can withstand fires typically ranging from 500° C. to 2000° C. and more typically ranging from about 700° C. to about 1100° C. In some embodiments, the non-conductive fire-resistant material acts as an electrically insulating barrier between an electrically conductive anisotropic layer and the cell can 202 and cell header 207, which can electrically short if they come in contact. The non-conductive fire-resistant material can, for example, include polybenzimidazole fiber, aramids (para and meta), fire-resistant cotton, nylons, coated nylons, polyhydroquinone-diimidazopyridine (PIPD) fiber, melamine, modacrylic, leather, modified leathers, polystyrene, polypropylene, polyphenylene ether, a tetrafluoroethylene-perfluoroalkylvinylether copolymer, polycarbonate, polyphenylene sulfide, polybutylene terephthalate, and/or any combination thereof. Other materials that can be included in wall 310 include 3M® Flame Barrier FRB-NT Series™. In other embodiments, wall 310 can have properties of both a structural element 370 and a substantially non-conductive fire-resistant material 350. For instance, wall 310 can be a puncture resistant non-conductive fire-resistant barrier.

Figure 3B:
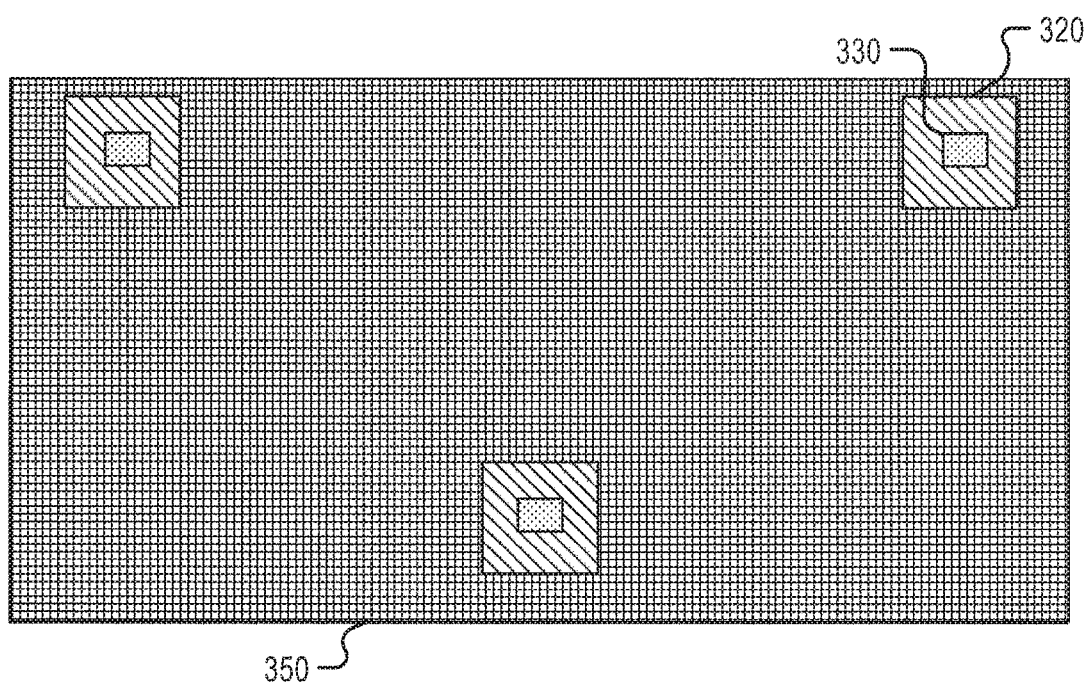
FIG. 3B shows a front isometric view of the wall between battery module.

In some embodiments, there may be a structural element 370, an anisotropic material 320, and a fire-resistant layer 350 all layered together (shown in FIG. 3B). In these embodiments, the fire-resistant layer 350 may be covering anisotropic material 320 and anisotropic material 320 may cover structural element 370.

Wall 310 may also have a variety of thicknesses of its various layers. For instance, wall 310 can include one or more layers of the thermally anisotropic material 320 having a thickness typically ranging from about 0.040 to about 2 mm and more typically ranging from about 0.049 to about 1 mm. In embodiments where wall 310 has one or more layers of the structural element 370, the structural elements 370 have a thickness typically ranging from about 0.040 to about 0.080 mm and more typically ranging from about 0.049 to about 0.056 mm. In embodiments, where wall 310 has one or more layers of the fire-resistant layer 350 with a thickness typically ranging from about 0.075 to 0.4 mm, more typically from about 0.1 to about 0.26 mm, more typically from about 0.1 to about 0.2 mm, and more typically from about 0.125 mm to about 0.15 mm. A total thickness of the wall 310 typically ranges from about 1.5 to about 4 mm and more typically ranging from about 1.75 to about 2 mm.

In situations, where thermal runaway occurs or is in the process of occurring, a battery cell vent may expel hot gas, electrolyte, electrodes, etc. The thermally anisotropic material 320 is positioned to be in spatial proximity to the header 207 of venting battery cell 308 such that the heat from the battery cell vent would at least partially transfer to the thermally anisotropic material 320 for early detection by one or more sensors 330. Thermally anisotropic material 320 may be designed to have poor through plane thermal conductivity while having high in-plane thermal conductivity. Thus, thermally anisotropic material 320 can by rapid transfer of thermal energy away from the thermal runaway cell also retard the spread of heat, or thermal energy transfer, to battery cells 308 on the other side of wall 310 and also spread the heat, or transfer thermal energy, away from an area where venting is occurring. Rapidly spreading or transferring the heat along thermally anisotropic material 320 can prevent other nearby battery cells 308 from overheating and undergoing thermal runaway.

The in-plane thermal conductivity of thermally anisotropic material 320 may be typically from about 650 W/m-K to about 250 W/m-K, more typically from about 600 W/m-K to about 260 W/m-K, more typically from about 550 W/m-K to about 270 W/m-K, more typically from about 520 W/m-K to about 280 W/m-K, more typically from about 510 W/m-K to about 290 W/m-K, more typically from about 500 W/m-K to about 300 W/m-K, more typically from about 490 W/m-K to about 310 W/m-K, more typically from about 480 W/m-K to about 320 W/m-K, more typically from about 470 W/m-K to about 330 W/m-K, more typically from about 460 W/m-K to about 340 W/m-K, more typically from about 450 W/m-K to about 350 W/m-K, more typically from about 440 W/m-K to about 360 W/m-K, more typically from about 430 W/m-K to about 370 W/m-K, more typically from about 420 W/m-K to about 380 W/m-K, more typically from about 410 W/m-K to about 390 W/m-K, or more typically 400 W/m-K.

The through-plane thermal conductivity of the material(s) may be typically from 2.4 W/m-K to 5.0 W/m-K, more typically from 2.5 W/m-K to 4.9 W/m-K, more typically from 2.6 W/m-K to 4.8 W/m-K, more typically from 2.7 W/m-K to 4.7 W/m-K, more typically from 2.8 W/m-K to 4.6 W/m-K, more typically from 2.9 W/m-K to 4.5 W/m-K, more typically from 3.0 W/m-K to 4.4 W/m-K, more typically from 3.1 W/m-K to 4.3 W/m-K, more typically from 3.2 W/m-K to 4.2 W/m-K, more typically from 3.3 W/m-K to 4.1 W/m-K, more typically from 3.4 W/m-K to 4.0 W/m-K, more typically from 3.5 W/m-K to 3.9 W/m-K, more typically from 3.6 W/m-K to 3.8 W/m-K, or more typically 3.7 W/m-K.

In some embodiments, the in-plane thermal conductivity is greater than the through-plane thermal conductivity of the thermally anisotropic material 320, more typically is at least about 50% greater than the through-plane thermal conductivity of the thermally anisotropic material 320, more typically is at least about 100% greater than the through-plane thermal conductivity of the thermally anisotropic material 320, more typically is at least about 200% greater than the through-plane thermal conductivity of the thermally anisotropic material 320, more typically is at least about 300% greater than the through-plane thermal conductivity of the thermally anisotropic material 320, more typically is at least about 400% greater than the through-plane thermal conductivity of the thermally anisotropic material 320, more typically is at least about 500% greater than the through-plane thermal conductivity of the thermally anisotropic material 320, more typically is at least about 600% greater than the through-plane thermal conductivity of the thermally anisotropic material 320, more typically is at least about 700% greater than the through-plane thermal conductivity of the thermally anisotropic material 320, more typically is at least about 800% greater than the through-plane thermal conductivity of the thermally anisotropic material 320, more typically is at least about 900% greater than the through-plane thermal conductivity of the thermally anisotropic material 320, more typically is at least about 1,000% greater than the through-plane thermal conductivity of the thermally anisotropic material 320, and more typically is at least about 1500% greater than the through-plane thermal conductivity of the thermally anisotropic material 320.

In some embodiments, thermally anisotropic material 320 can be configured to be sufficiently insulating such that the other materials in the wall 310 is/are not required. Thus, in some embodiments wall 310 may be formed by only the thermally anisotropic material 320. Stated differently, in alternative embodiments thermally anisotropic material 320 may be the only material that separates the two rows of battery cells 308.

In other embodiments it is possible that battery cells 308 are not in two rows but face-up towards an upper shield or lid (not shown) of battery module 108. In these embodiments thermally anisotropic material 320 is fixed to the bottom surface of the upper shield or lid. Thermally anisotropic material 320 can be configured to be in proximity to the header 207 of a venting battery cell 308 such that the heat from the battery cell 308 vent would at least partially transfer to thermally anisotropic material 320 fixed to the upper shield or lid.

Cold plate 340 can be used to separate battery cells 308 within the same battery module 108. For instance, in some embodiments a battery module 108 may house two rows of battery cells 308, where the headers of the two rows of battery cells may be facing away from each other, these two rows of battery cells may also be separated by cold plate 340. Cold plate 340 may be a cooling plate which is in thermal contact with a cooling medium to cool battery cells 308.

FIG. 3A also contains sensors 330 positioned so as to sense a thermal state, or temperature, of the thermally anisotropic material 320 positioned on an adjacent exterior surface of the wall 310. A non-exhaustive list of sensor types could include the following: a luminescence sensor, a temperature sensor (e.g., a thermistor, thermocouple or infrared thermometer), a smoke sensor, a pressure sensor, and/or a wavelength sensor. Sensors 330 may have multiple kinds of sensors housed within a single sensor housing, for example sensor 330 could be both a light and temperature sensor. Multiple types of sensors placed within a single sensor housing may lead to reduced weight, reduced false positives, or both.

Due to the high in-plane thermal conductivity of the thermally anisotropic material 320, sensors 330 can monitor an entire battery module 108 from a few discrete locations. Sensors 330 can be configured to monitor small or large areas within the battery module 108. Sensors 330 can be integrated into (or in communication with) a battery management system 532 (BMS). Sensors 330 can monitor the thermally anisotropic material 320 such that when the thermally anisotropic material 320 heats-up the sensor communicates a warning signal to the BMS 532. Sensors 330 can either be placed intermittently along anisotropic material 320 or in other embodiments, there can be a single sensor placed at either end of wall 310. In some embodiments, sensors 330 can be placed in the battery module 108, or in other places not along anisotropic material 320; for instance, sensor 330 can be placed on an outer wall of battery module enclosure 360. Some embodiments can include a light sensor 330 placed outside the battery module enclosure 360.

FIG. 3B shows front isometric view of wall 310. In FIG. 3B certain elements have been removed, in order to provide a clear view of the interior of the battery module 108. FIG. 3B shows an embodiment where anisotropic material 320 is placed on over structural element 370. FIG. 3B also shows an embodiment where sensor(s) 330 is placed in operative contact with anisotropic material 320, furthermore this embodiment also shows a fire-resistant layer 350 placed over the anisotropic material 320. Sections of fire-resistant layer 350 were removed so the anisotropic material 320 and sensors below could be revealed. FIG. 3A also depicts sensor 330 placed on the outerwall of the battery module enclosure 360. In some embodiments, BMS 532 can be placed on an outside wall of the battery module enclosure 360.

Figure 4:
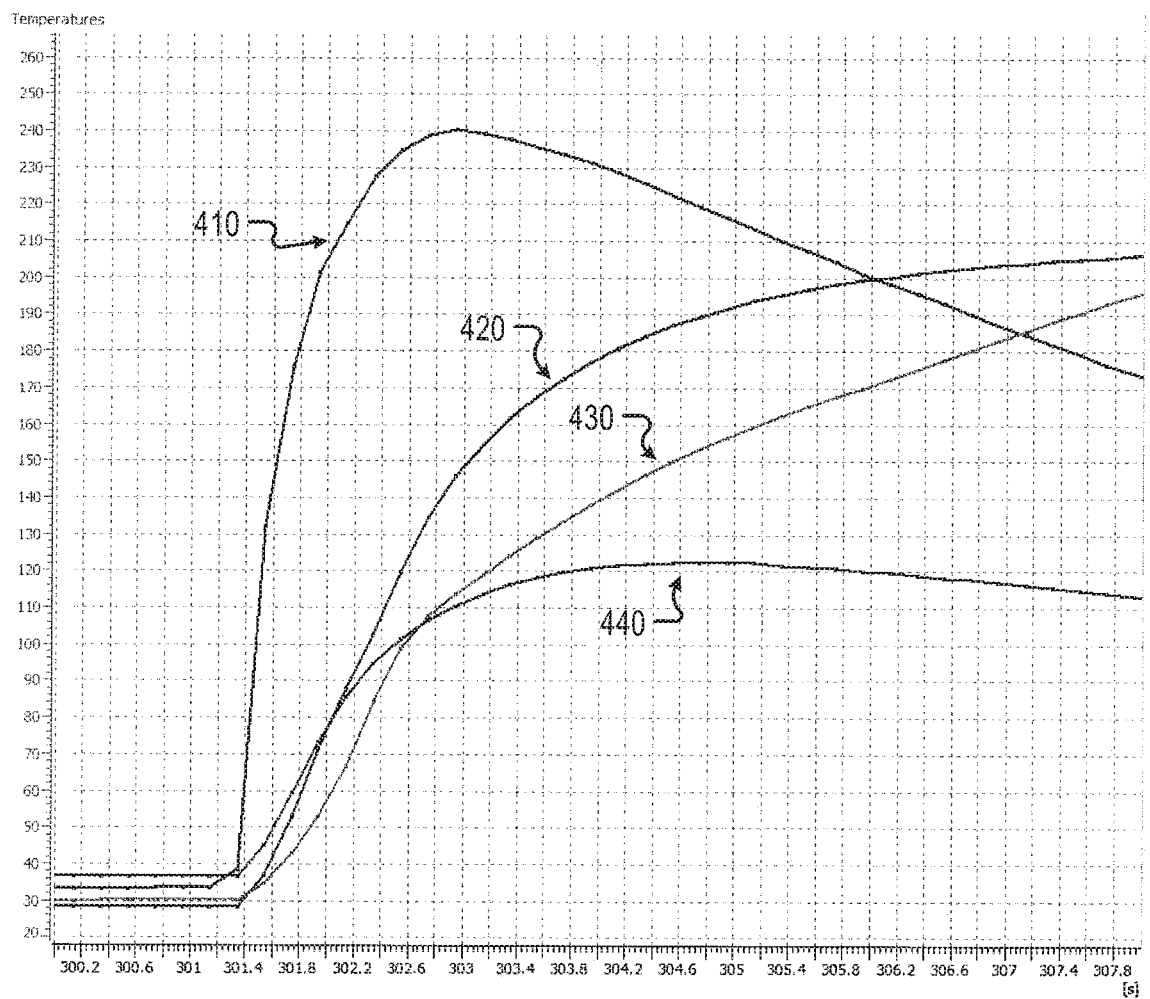
FIG. 4 shows a thermal incident profile in accordance with embodiments of the present disclosure.

FIG. 4 is a representation of a thermal incident profile. The chart shows sensor 330 that has received a thermal incident profile. The thermal incident can be represented by the top line 410. Top line represents sensor 330 collecting temperature data of thermally anisotropic material 320 next to a cell in thermal runaway, the top line 410 indicates there has been a thermal incident, battery cell 308 is venting hot gas, electrolyte, electrodes, etc. The second line 420 and third line 430 represent the temperature of adjacent battery cells 308. This thermal incident profile can be used to triangulate which battery cell 308 in the array of cells has gone into thermal runaway. The thermal profile of FIG. 4 can be used to determine other battery cells that have gone into thermal runaway. The bottom line 440 is the temperature of the thermally anisotropic material 320 some distance away from the initial thermal incident. The increased temperature along thermally anisotropic material 320 some distance away from the thermal incident can be used by BMS 532 to determine the existence of a thermal incident.

During normal operation the temperature inside the modules will fluctuate due to increased discharge or charge rates or changes in ambient temperature conditions. The temperatures recorded by sensor 330 will fluctuate. In order to determine whether an increase in temperature is due to a battery cell 308 going into thermal runaway or a normal condition, one measures multiple sensors 330 in multiple modules 108. A sensor 330 that measures a temperature increase due to a thermal runaway will be greater than a module 108 in which there was no thermal runaway. Therefore, by measuring differential temperatures in multiple sensors 308 in multiple modules 108, false positives can be prevented.

Figure 5:
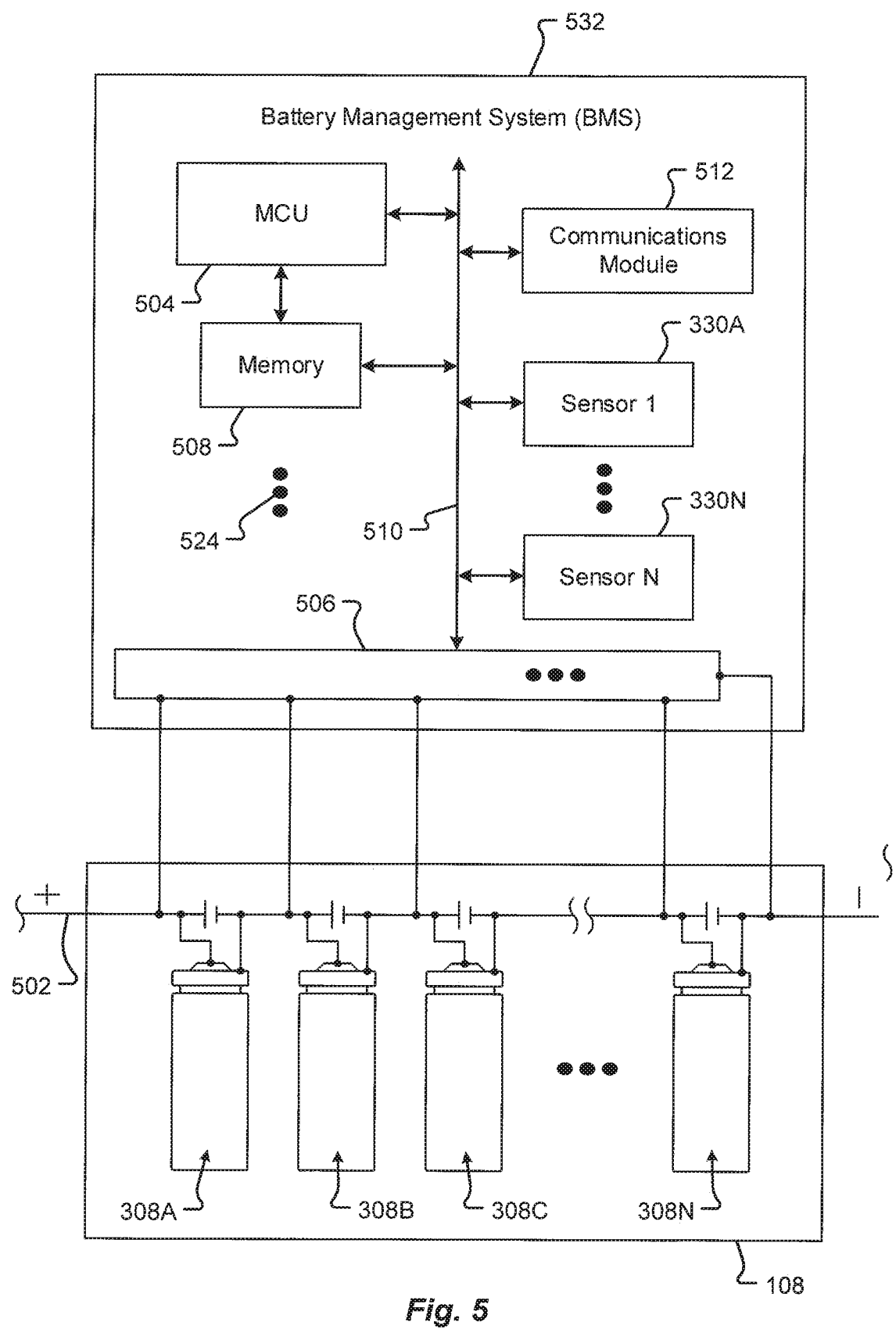
FIG. 5 shows a schematic block diagram of the battery management system in accordance with embodiments of the present disclosure.

FIG. 5 shows a schematic block diagram of the BMS 532 (also in some embodiments referred to as a slave BMS or Cell Sense Controller ("CSC") or Cell Management Unit ("CMU")) interconnected with the battery module 108. In some embodiments, each battery module 108 of a battery 104 may include a corresponding unique slave BMS 532. In other embodiments, the multi-module battery 104 comprising a number of battery modules 108 may be monitored and/or controlled by a single multi-module BMS. In another embodiment, the BMS 532 electronics (e.g., printed circuit board, chips, etc.) may be mounted to an exterior or interior surface of the battery module 108 or along a single or numerous battery cells 308.

The BMS 532 may include a bus 506 including a number of terminals configured to interconnect with electrical lines 502 interconnected with the battery cells 308 of the battery module 108. In some embodiments, the interconnection between the battery module 108 and the BMS 532 may be via a physical electrical connector disposed on the battery module 108, the BMS 532, and/or both the battery module 108 and the BMS 532. The BMS 532 may be configured to monitor the occurrence of thermal incidents associated with each battery cell 308A-N in the battery module 108. In some embodiments, the BMS 532 may include a microcontroller unit (MCU or Application-Specific Integrated Circuit or ASIC) 304, including one or more processors, interconnected with a memory 508 via at least one connection, or communications bus 510. The memory 508 may be one or more disk drives, optical storage devices, solid-state storage devices such as a random access memory (RAM) and/or a read-only memory (ROM), which can be programmable, flash-updateable and/or the like. Additionally or alternatively, the BMS 532 may include a communications module 512, one or more sensors 330A-N, and/or other components 524 interconnected with the communication bus 510, charger (not shown), and/or other systems in an electric power distribution system (not shown). The communications module 512 may include a modem, a network card (wireless or wired), an infrared communication device, etc. and may permit data to be exchanged with a network and/or any other charger or processor in the electric power distribution system as described.

In any event, pairs of electrical interconnections may provide voltages from the battery module 108 to the MCU 504 of the BMS 532 and these voltages may be used to determine a state (e.g., voltage, current, state of charge, etc.) associated with a particular battery cell 308A-N in the battery module 108.

Examples of the processors as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Infineon TriCore™ processors, other industry-equivalent processors, and may perform computational functions using any known or future-developed standard, instruction set, libraries, and/or architecture.

In one embodiment, the sensors 330A-N may include one or more of the sensors noted above. The sensors 330A-N may be disposed between, adjacent to, spaced apart from, and/or in operational contact with, a thermally anisotropic material 320 positioned adjacent to one or more of the battery cells 308A-N. Alternatively or additionally, sensor 330 can be placed proximally to wall 310.

BMS 532 can determine a thermal runaway event in one or more battery cell(s) 308 through a variety of methods. A non-exhaustive list of methods BMS 532 could use in processing sensor output to determine the occurrence of a thermal runaway event includes: pattern matching sensor output against predetermined sensor output corresponding to a thermal runaway event, boundary processing, image processing, threshold transgression, sensor value processing, etc. In some embodiments, once BMS 532 has determined there has been a thermal incident BMS 532, either through communications module 512 or MCU 504, BMS can alert the drive or a third party of the thermal incident. The driver may be prompted to stop the vehicle if a thermal incident has been detected. While BMS 532 is shown as a master BMS, it is to be appreciated that the BMS could be a slave BMS depending on the configuration.

Once BMS 532 has detected a thermal incident there are a number of options BMS 532 can exercise. Additionally or alternatively, BMS 532 may closely monitor the thermal incident and decide not to alert the driver until there are further thermal incidents. In alternative embodiments, BMS 532 can deactivate a segment or segments of the battery module 108 where the thermal incident has occurred and redistribute the power load amongst other battery cells 308 or battery modules 104. It is possible that even if BMS 532 determines there was a thermal incident, BMS 532 may not alert the driver. BMS 532 can determine whether the vehicle 100, battery module 108, or battery cells 308 are undergoing a diagnostic test, hot environment, maintenance, etc. In instances, where BMS 532 detects a thermal incident but BMS determines the thermal incident is the result of environmental factors there may be no alert sent to driver or third party. Further, in one embodiment, BMS 532 can monitor the time between a single thermal event or a number of thermal incidents and determine whether the vehicle can continue to safely be driven, despite the thermal incidents. The time between when a single thermal event or a number of thermal incidents occurs and when BMS 532 may alert the driver of a thermal incident can be configurable. There can be embodiments, when BMS 532 determines there was a thermal incident but can efficiently deactivate and redistribute power load to not cause interruption to the driver. In these instances, it is possible BMS 532 may not alert the driver or a third party. Further, there may be instances where BMS 532 gives the driver an alert, the driver stops, and a period of time elapses where BMS 532 can determine the conditions are now safe to resume driving. The time between when the driver stops the vehicle 100 and when BMS 532 may alert the driver of it is safe to resume driving is configurable.

In some embodiments, once the driver has stopped the vehicle 100, BMS 532 may deactivate part of all of a thermally runaway battery module 108 until the thermal incident has subsided or until certain criterion are met. A non-exhaustive list of some of the criterion that may need to be met would include the following: time passed without a thermal incident, thermally anisotropic material 320 is below a certain temp, a certain light intensity, strain on other battery modules 108 and/or any combination thereof.

The exemplary systems and methods of this disclosure have been described in relation to a battery module 108 and a number of battery cells 308 in an electric vehicle energy storage system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others. In some embodiments, the present disclosure provides an electrical interconnection device that can be used between any electrical source and destination. While the present disclosure describes connections between battery modules and corresponding management systems, embodiments of the present disclosure should not be so limited.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Any one or more of the aspects/embodiments as substantially disclosed herein optionally in combination with any one or more other aspects/embodiments as substantially disclosed herein.

One or more means have been adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A thermal incident detection apparatus for a battery pack, the thermal incident detection apparatus comprising:
   a structural element including a first surface and a second surface opposite the first surface;
   a thermally anisotropic material on the first surface and the second surface of the structural element, wherein the thermally anisotropic material has an in-plane thermal conductivity greater than a through-plane thermal conductivity;
   a first sensor positioned at a first side of the structural element in operational contact with the thermally anisotropic material on the first surface, the first sensor being configured to output a first signal based on sensed thermal energy transferred by one or more first battery cells of a first battery module to the thermally anisotropic material; and
   a second sensor positioned at a second side of the structural element opposite the first side and in operational contact with the thermally anisotropic material on the second surface, the second sensor being configured to output a second signal based on sensed thermal energy transferred by one or more second battery cells of a second battery module to the thermally anisotropic material.

2. The thermal incident detection apparatus of claim 1, wherein the thermally anisotropic material is made of natural graphite or synthetic graphite, wherein the first and second sensors are in physical contact with the thermally anisotropic material, and wherein vents of the one or more first battery cells face the first surface of the structure element upon placement of the first batter module into the battery pack.

3. The thermal incident detection apparatus of claim 1, wherein a header of each battery cell in the one or more first battery cells and the one or more second battery cells is oriented in the direction of the structural element upon placement of the first battery module and the second battery module into the battery pack.

4. The thermal incident detection apparatus of claim 1, wherein the first and second sensors include at least one of a temperature sensor or a light sensor, and wherein the structural element is rigid.

5. The thermal incident detection apparatus of claim 1, wherein the thermally anisotropic material has the in-plane thermal conductivity of about 250 W/m-K and the through-plane thermal conductivity of about 2.5 W/m-K.

6. The thermal incident detection apparatus of claim 1, wherein the ratio of the in-plane thermal conductivity to the through plane thermal conductivity is at least about 66.

7. The thermal incident detection apparatus of claim 1, further comprising third and fourth sensors placed at the first side of the structural element in operational contact with the thermally anisotropic material, wherein the first, third, and fourth sensors enable a battery management system to triangulate a location of a battery cell that has undergone a thermal incident.

8. A method for detecting a thermal incident in a battery module comprising a plurality of vented cells, the method comprising:
   sensing, by first, second, and third sensors of a vehicle, a level of thermal energy in a thermally anisotropic material in thermal communication with one or more of the plurality of vented cells in the battery module, the thermally anisotropic material having an in-plane thermal conductivity of at least about 250 W/m-K;
   determining, by a battery management system, that the sensed level of thermal energy is abnormal and associated with an occurrence of a thermal incident;
   triangulating a location of the thermal incident based on output of the first, second, and third sensors; and
   implementing, by the battery management system, a predetermined action associated with the occurrence of the thermal incident, wherein the predetermined action includes:
      deactivating at least some of the plurality of vented cells at the triangulated location of the thermal incident; and
      redistributing power load to other ones of the plurality of vented cells that are not deactivated.

9. The method of claim 8, further comprising determining whether the occurrence of the thermal incident is a false positive.

10. The method of claim 8, further comprising determining whether the thermal incident is a single occurrence for the battery module or whether the thermal incident is one of multiple thermal incidents in the battery module.

11. The method of claim 8, further comprising measuring time elapsed between the thermal incident and a previous thermal incident to determine whether the vehicle is safe to operate.

12. The method of claim 8, wherein the battery management system comprises:
at least one processing unit, a memory, a bus configured to connect the first, second, and third sensors and the at least one processing unit, and a communications module.

13. The method of claim 12, wherein the processing unit uses sensor value processing, boundary processing, or image processing.

14. A battery pack for an electric vehicle system, comprising:
a structural element including a first surface and a second surface opposite the first surface;
a first battery module including one or more first battery cells at a first side of the structural element;
a second battery module including one or more second battery cells at a second side of the structural element opposite the first side;
a thermally anisotropic material being on the first surface and the second surface of the structural element, wherein the thermally anisotropic material has an in-plane thermal conductivity greater than a through-plane thermal conductivity;
a first sensor positioned at the first side of the structural element in operational contact with the thermally anisotropic material on the first surface, the first sensor being configured to output a first signal based on sensed thermal energy transferred by the one or more first battery cells to the thermally anisotropic material; and
a second sensor positioned at the second side of the structural element in operational contact with the thermally anisotropic material on the second surface, the second sensor being configured to output a second signal based on sensed thermal energy transferred by the one or more second battery cells to the thermally anisotropic material.

15. The battery pack of claim 14, wherein at least one of the first sensor or the second sensor includes at least one of a luminescence sensor, a temperature sensor, or a wavelength sensor.

16. The battery pack of claim 14, wherein the thermally anisotropic material has the in-plane thermal conductivity of about 250 W/m-K and the through-plane thermal conductivity of about 2.5 W/m-K.

17. The battery pack of claim 14, wherein the ratio of the in-plane thermal conductivity to the through-plane thermal conductivity is at least about 65.

18. The battery pack of claim 14, wherein a header of each battery cell in the one or more first battery cells and the one or more second battery cells is oriented in a direction of the structural element.

19. The battery pack of claim 14, further comprising a third sensor positioned on a wall of a battery module enclosure of the first battery module to capture light.

* * * * *

UNITED STATES PATENT AND TRADEMARK OFFICE
CERTIFICATE OF CORRECTION

| | |
|---|---|
| PATENT NO. | : 11,205,809 B2 |
| APPLICATION NO. | : 16/742626 |
| DATED | : December 21, 2021 |
| INVENTOR(S) | : Marc W. Juzkow et al. |

Page 1 of 1

It is certified that error appears in the above-identified patent and that said Letters Patent is hereby corrected as shown below:

In the Claims

Claim 2, Column 16, Line 12, delete "batter" and insert --battery-- therein.
Claim 3, Column 16, Line 17, delete "oriented in the direction" and insert --oriented in a direction-- therein.
Claim 6, Column 16, Line 30, delete "through plane" and insert --through-plane-- therein.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*